United States Patent
Cable et al.

(10) Patent No.: US 6,854,013 B2
(45) Date of Patent: Feb. 8, 2005

(54) METHOD AND APPARATUS FOR OPTIMIZING NETWORK SERVICE

(75) Inventors: Julian Cable, Herts (GB); Clive Hayball, Herts (GB); Nigel Bragg, Weston Colville (GB)

(73) Assignee: Nortel Networks Limited, St. Laurent (CA)

( * ) Notice: Subject to any disclaimer, the term of this patent is extended or adjusted under 35 U.S.C. 154(b) by 729 days.

(21) Appl. No.: 09/888,883

(22) Filed: Jun. 25, 2001

(65) Prior Publication Data

US 2002/0199012 A1 Dec. 26, 2002

(51) Int. Cl.$^7$ ............................................. G06F 15/173
(52) U.S. Cl. ...................... 709/226; 709/201; 709/203; 709/229; 370/230; 370/468
(58) Field of Search ................................ 709/200–203, 709/217, 223–229, 231–232; 707/10; 718/102, 105; 370/229–230, 235–236, 351–356, 468

(56) References Cited

U.S. PATENT DOCUMENTS

| | | | |
|---|---|---|---|
| 5,548,579 A * | 8/1996 | Lebrun et al. | 370/468 |
| 5,581,703 A * | 12/1996 | Baugher et al. | 709/225 |
| 5,701,465 A * | 12/1997 | Baugher et al. | 709/229 |
| 6,223,222 B1 * | 4/2001 | Fijolek et al. | 709/227 |
| 6,404,738 B1 * | 6/2002 | Reininger et al. | 370/236 |
| 6,516,350 B1 * | 2/2003 | Lumelsky et al. | 709/226 |
| 6,529,499 B1 * | 3/2003 | Doshi et al. | 370/352 |
| 6,647,419 B1 * | 11/2003 | Mogul | 709/226 |
| 6,690,678 B1 * | 2/2004 | Basso et al. | 370/468 |

* cited by examiner

Primary Examiner—Bharat Barot
(74) Attorney, Agent, or Firm—Barnes & Thornburg LLP

(57) ABSTRACT

There is presently no single accepted scheme to support Quality of Service guarantees for IP based applications, although RSVP is the prevailing standard for network resource reservation. Thus, providing end-to-end Quality of Service guarantees for content delivery across the Internet presents a challenge for Service Providers. Typically load balancing algorithms are used for picking the best server, with respect to server capacity for satisfying a request, but they can not guarantee Quality of Service for the whole duration of the network transaction. The invention proposes a method of distributing server load in an IP network, comprising building an association between a subscriber edge device and a server controller using a packet switched network Quality of Service mechanism. A fair share of server bandwidth is offered out to the subscriber edge device, and a resource request from the client is directed, via the subscriber edge device and through a server controller, to a server having an amount of server bandwidth required by the client. The required fair share of server bandwidth is then reserved for meeting the client's resource request. The invention also proposes a subscriber edge device, a data center device, and a communications network comprising each. The subscriber edge device comprises, a resource requester for sending a request to the server controller associated with the source location of the requested resource, a resource reserver that reserves an amount of bandwidth using a Quality of Service mechanism and releases any unneeded bandwidth, and a resource returner that returns the requested resource to the client. The data center device comprises, a resource allocator that allocates fair shares of server bandwidth to the network, and a server controller that offers fair shares of server bandwidth using a Quality of Service mechanism.

30 Claims, 2 Drawing Sheets

METHOD AND APPARATUS FOR OPTIMIZING NETWORK SERVICE

FIELD OF THE INVENTION

The present invention relates to a method and apparatus for optimizing network service for users of packet switched networks such as the Internet and, more particularly, for determining the best server to satisfy a user's request and ensuring there is adequate bandwidth between that server and user.

BACKGROUND OF THE INVENTION

For Internet communications, network nodes always transmit information in packets. The packet format is specified in part by an applicable network-level protocol, and that format includes a network-address field that identifies a node interface to which the packet is directed. A protocol typically used for this purpose is the Internet Protocol ("IP"), which is defined in the Internet Community's Request for comments ("RFC") 791.

Network Quality of Service (QoS) mechanisms focus on how to guarantee bandwidth between a given known pair of nodes. Examples of such mechanisms are int-serv, (including RSVP) and diff-serv.

Providing end-to-end QoS guarantees for content delivery across the internet presents a number of challenges for service providers, including, the ability of network mechanisms to support QoS. This is because QoS support is not widely available. It is therefore hard or almost impossible at present to provide QoS guarantees across multiple networks as there are no agreed standard mechanism and service level agreement (SLA) guarantees in place. In addition there is presently no single accepted scheme to support QoS guarantees for internet protocol based (IP-based) applications, although RSVP is the prevailing standard for network resource reservation. Consequently, different QoS mechanisms are needed for different access technologies.

Typically load balancing algorithms are used for picking the best server in a network, with respect to server capacity, for satisfying a request. However they can not guarantee QoS for the whole duration of the network transaction, i.e. they can not guarantee network connectivity or capacity throughout the whole of the session.

Load re-balancing refers to the ability of a client enabled with processes in accordance with a specified network mechanism, to re-map a path through a plurality of nodes to a resource. Modern requirements demand that any load balancing system be scalable. Such scalability limits the degradation of system response time as new members, nodes or objects are added, removed or modified within the existing infrastructure.

In ATM networks, the ATM "Anycast" mechanism is employed to overcome this problem, however in the IP domain the Anycast mechanism does not provide a QoS guarantee. Also, in the IP domain, the Anycast mechanism does not take server load capability into account, instead only the network speed is taken into consideration when selecting the best path.

It is a general objective of the present invention to overcome or significantly mitigate one or more of the aforementioned problems.

SUMMARY OF THE INVENTION

According to a first aspect of the invention there is provided a method of distributing server load in an IP network, comprising: building an association between a subscriber edge device and a server controller using a packet switched network Quality of Service QoS mechanism; offering out a fair share of server bandwidth to the subscriber edge device; directing a resource request from a client using the subscriber edge device to a server having an amount of the fair share of server bandwidth required by the client, through a server controller; and reserving the required fair share of server bandwidth, or a portion thereof, for meeting the resource request of the client.

According to a second aspect of the invention there is provided a method of distributing server lead in an IP network, comprising: building an association between a subscriber edge device and a server controller using a packet switched network Quality of Service QoS mechanism; offering out a fair share of server bandwidth to the subscriber edge device; requesting an amount of the offered fair share of server bandwidth from a server through the server controller; intercepting a reservation message issued by the server for reserving the offered fair share of server bandwidth, or a portion thereof; and keeping a tally on both the server controller and the subscriber edge device of used bandwidth for a route through the IP network.

According to a third aspect of the invention there is provided a method of distributing server load in an IP network, comprising: building an association between a subscriber edge device and a server controller using a packet switched network Quality of Service QoS mechanism; offering out a fair share of server bandwidth to the subscriber edge device; requesting an amount of the offered fair share of server bandwidth from a server through the server controller; intercepting a reservation message issued by the server for reserving the requested amount of server bandwidth; issuing a release message, ahead of the reservation message travelling from the server controller to the subscriber edge device, for releasing the requested amount of the offered fair share of server bandwidth; and forwarding the reservation message to the subscriber edge device behind the release message.

According to a fourth aspect of the invention there is provided a subscriber edge device for an IP-based network, comprising: a data input for receiving data from the network; a data output for sending data to the network; a resource requester for identifying a request for a resource in data received at the data input and for sending a network request to a server controller associated with the source location of the resource specified in a client request; a resource reserver for reserving an amount of bandwidth offered by the server controller through a QoS mechanism and for releasing any unneeded amount of bandwidth, wherein the device is adapted to make use of bandwidth optimally; and a resource returner for obtaining the requested resource from the source location of the requested resource using the reserved amount of bandwidth, and for returning the requested resource to a client.

According to a fifth aspect of the invention there is provided a data center device for an IP-based network, comprising: a data input for receiving data from the network; a data output for sending data to the network; a resource allocator for allocating fair shares of server bandwidth to the network; and a server controller for offering the allocated fair shares of server bandwidth in response to a resource request received from the network, using a Quality of Service QoS mechanism.

According to a sixth aspect of the invention there is provided a communications network comprising the edge-based device as described above.

According to a seventh aspect of the invention there is provided a communications network comprising the datacenter device as described above.

According to an eighth aspect of the invention there is provided a communications network comprising the datacenter device and the edge-based device, both as described above.

According to a ninth aspect of the invention there is provided a computer readable storage medium storing instructions that, when executed by a computer, cause the computer to perform a method of balancing server load in an IP network, the method comprising: directing a resource request from a client using an edge-based device to a plurality of servers having an amount of bandwidth, through a server controller; building an association between the edge-based device and the server controller using a packet switched network Quality of Service (QoS) mechanism; allocating a fair share of server bandwidth to the edge-based device; offering out the allocation of the fair share to the edge-based device; and reserving the fair share, or a portion thereof, for meeting the resource requests of the client.

According to a tenth aspect of the invention there is provided a computer readable storage medium storing instructions that, when executed by a computer, cause the computer to perform a method of distributing server load in an IP network, the method comprising: building an association between a subscriber edge device and a server controller using a packet switched network Quality of Service QoS mechanism; offering out a fair share of server bandwidth to the subscriber edge device; requesting an amount of the offered fair share of server bandwidth from a server through the server controller; intercepting a reservation message issued by the server for reserving the offered fair share of server bandwidth, or a portion thereof; and keeping a tally on both the server controller and the subscriber edge device of used bandwidth for a route through the IP network.

According to an eleventh aspect of the invention there is provided a computer readable storage medium storing instructions that, when executed by a computer, cause the computer to perform a method of distributing server load in an IP network, the method comprising: building an association between a subscriber edge device and a server controller using a packet switched network Quality of Service QoS mechanism; offering out a fair share of server bandwidth to the subscriber edge device; requesting an amount of the offered fair share of server bandwidth from a server through the server controller; intercepting a reservation message issued by the server for reserving the requested amount of server bandwidth; issuing a release message, ahead of the reservation message travelling from the server controller to the subscriber edge device, for releasing the requested amount of the offered fair share of server bandwidth; and forwarding the reservation message to the subscriber edge device behind the release message.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described by way of example only, with reference to the drawings in which:—

DETAILED DESCRIPTION OF THE PREFERRED EMBODIMENTS

Figure 1:
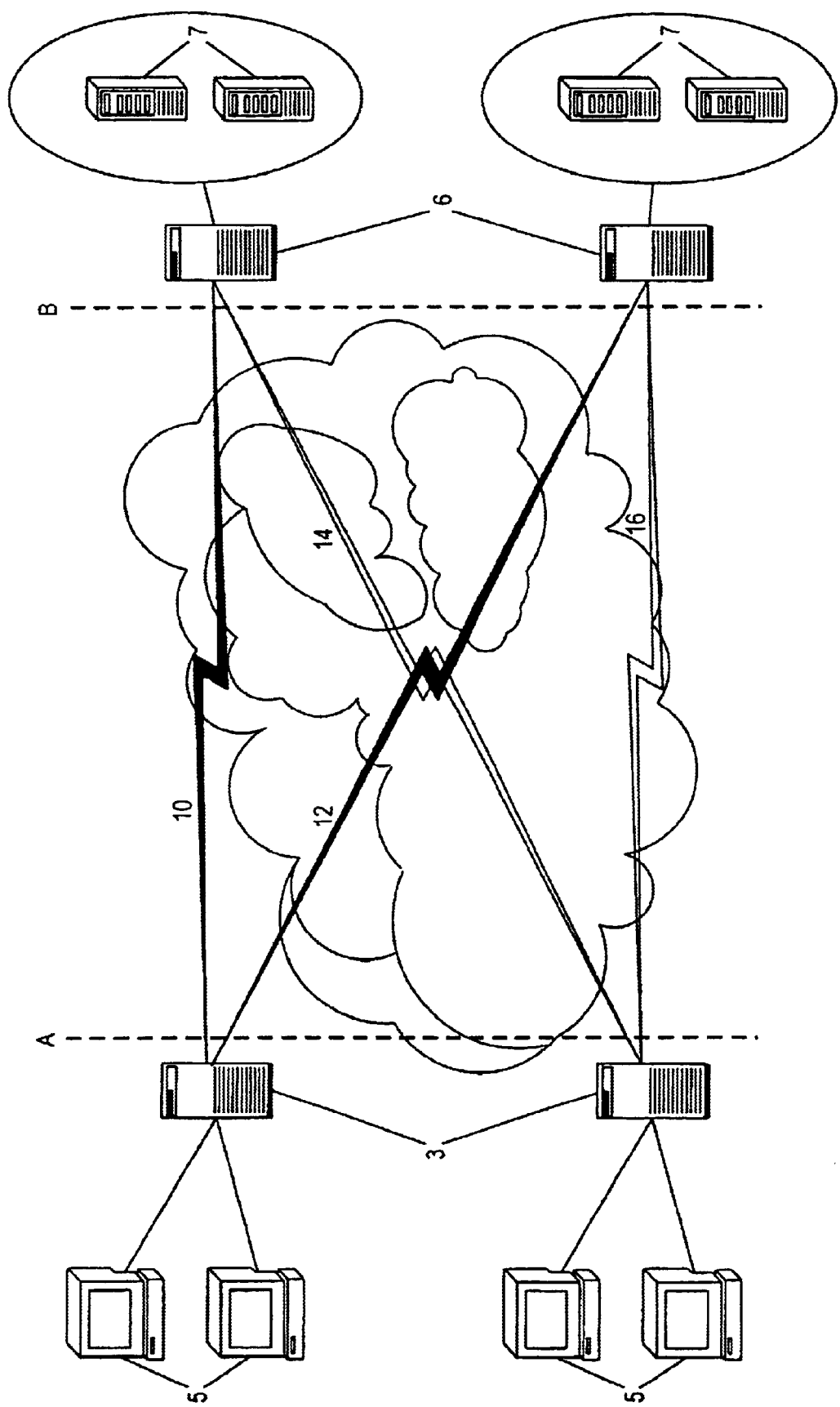
FIG. 1 is a schematic diagram depicting an illustrative environment in which an embodiment of the present invention may be implemented for determining the best server to satisfy a user's request.

With reference to FIG. 1, a load balancing system is shown which is divided into a client side (network edge) A and a server side (data center) B. The network edge A may include a number of clients 5 and a number of network edge devices 3, for example servers, which interact with a number of server controllers 6 on the server side. "Subscriber edge" devices 3, which perform in a similar fashion to a World Wide Web (WWW) proxy for WWW traffic, are set close to and are accessable to the clients 5. The subscriber edge devices 3 see all requests made by the clients 5 for a specific service. Each server controller is set close to the servers and is either implemented as a process on the associated server 7, or on a server switch, or as a proxy server. Each subscriber edge device 3 subscribes to the server controllers 6 forming a star network centered on the edge, whilst each server 7 sees a complimentary star network represented by the subscriber edges subscribed to it.

Interaction occurs at two levels. On one level negotiation takes place between the subscriber edge devices and server controllers in order to reserve bandwidth across the core network.

A second level of interaction occurs end-to-end, in that it takes place between the actual clients and the actual servers for the core network reservation to take place. Each of the servers 7 advertises its available bandwidth and/or capacity to the associated server controller 6. The server controller 6 takes this information into account for all of the servers 7 under its remit, and then offers fair shares of the servers' aggregate egress bandwidth to each subscriber edge device 3.

Sequentially, what occurs is as follows. Firstly, the server controller 6 is advised of the unused capacities of all the servers 7 under its control. It then advertises the aggregate unused capacity to the subscriber edge devices 3, each of which issues a response back to the server controller 6, saying how much bandwidth each requires.

If the message for signalling from the server controller 6 to the subscriber edge device 3 is a part of a true network reservation mechanism, then the network itself, between the two, can also modify the message or signal in some way that it may not be able to provide all of the requested capacity.

The reason for this being that the server controller may say it has, for example, a megabit (Mbit) of bandwidth, but there may be less than a Mbit available at some point in the core network, for example, if there was only half a megabit available on one rather critical link in the network. If a RSVP mechanism is used, the server controller 6 would be aware of the above situation occurring, as then every node along the path within the network is able to see the request for bandwidth, and may then modify the message according to how much bandwidth the server controller 6 could actually provide. A path or route 10, 12, 14 or 16 can only be pinned through the network if the bandwidth is actually available for doing so. Hence part of the negotiation is for ensuring that there is adequate bandwidth.

Figure 2:
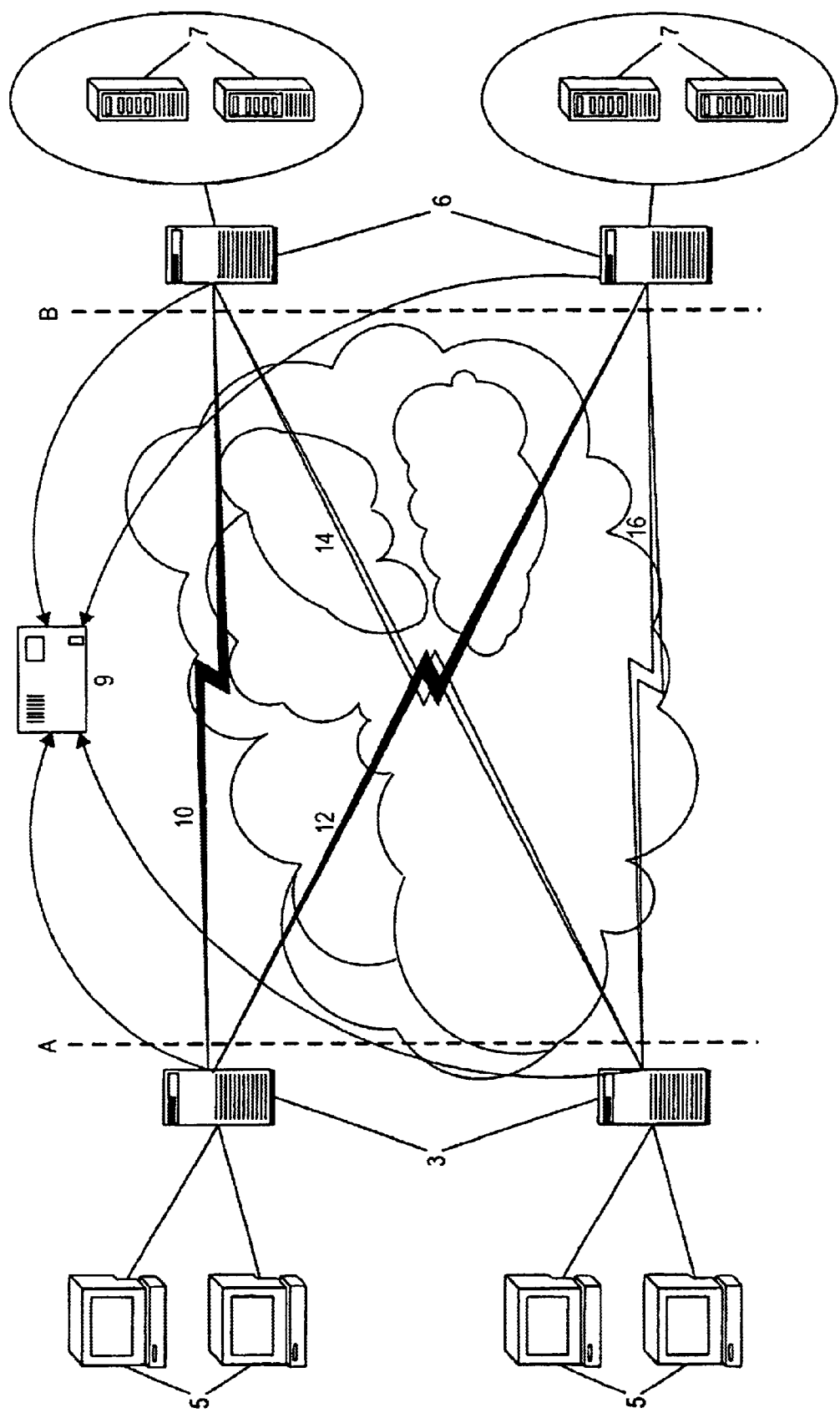
FIG. 2 is a schematic diagram of the embodiment of FIG. 1 with a bandwidth broker in place.

There are two ways of doing this, as shown in FIGS. 1 and 2. In the first the actual signaling mechanism across the network takes into account, at each hop, the available bandwidth, and modifies the message so that when the message eventually gets to the subscriber edge A it will have pinned the maximum requested bandwidth that is actually available. The other way is to use a bandwidth broker 9, as shown in FIG. 2, which is in control of all the bandwidth across the network. The bandwidth broker 9 knows how much real bandwidth, between any pair of server controllers 6 and subscriber edge devices 3, is available.

The subscriber edge devices 3 select the server 7 with the highest bandwidth reservation, releasing enough of this reservation to allow the network to admit the real flow. The client 5 then reserves the bandwidth it requires, however, the subscriber edge 3 may act as a proxy for doing this if the client 5 has no reservation capability.

The servers 7 re-calculate and re-advertise the available bandwidth to their associated server controller 6 which then re-negotiates with each subscriber edge device 3 at an appropriate interval. The fairness ensures that the servers 7 picked are servers that have a good chance of still satisfying their other subscribers.

Fair shares of the servers' 7 capacity that may be offered out are determined by the server agent associated with the server 7 in question. Rules or policies, set at the data center edge B of the system are employed to regulate the operation of offering out the fair shares. The offers may be modified according to load and fixed reservations for unsubscribed users, for example. The subscriber edge devices 3 determine the best server 7 for satisfying the requests, by employing load balancing algorithms, and then reserve this or a fraction of this bandwidth. Any underlying QoS mechanism can be used to implement the reservation and messages between the servers 7 and clients 5.

A preferred embodiment will now be described in more detail which uses RSVP as the QoS mechanism to implement the transaction/reservation. There are two layers of RSVP that operate, one that runs between the server controller 6 and the subscriber edge device 3 to do the aggregate reservation, and a second that is notionally running between the server 7 and the client 5 to do the reservations of individual sessions.

Each server 7 advertises its available bandwidth to its associated server controller 6 using SNMP, for example. Whereby the server controller 6 periodically reads an SNMP database on the server 7 to gather the information it needs in response to a signal issued periodically by the server 7 to let the server controller 6 know that it is still there.

Next a negotiation takes place between the server controller 6 and the subscriber edge device 3 using RSVP messages, resulting in a reservation of the required network resources. This negotiation process is described below in more detail.

A RSVP PATH message is sent from the server controller 6, to the subscriber edge device 3 in order to offer a share of a bandwidth that the network can achieve, and to pin out a route 10, 12, 14, or 16 through the network for the request. The actual offer made is an offer of a share of the bandwidth that the network could achieve against the requirement of the server controller 6. As the message passes through the network, it may be modified according to the available bandwidth. The subscriber edge device 3 may further modify the request because it maybe being offered more bandwidth than it really requires. When the subscriber edge device 3 has calculated how much bandwidth it requires after checking the requests of the clients 5, it issues a RSVP message to the sender, i.e. the server controller 6, which will do the actual reservation and pinning of the resources in the network. The IP is encapsulated within the RSVP trunk that is setup, and by nesting RSVP, only a small portion of the trunk is used.

Where more than one server 7 is able to provide the amount of bandwidth required, the subscriber edge device 3 chooses a server 7 and associated route, for example route 12 shown on FIG. 1. It forwards the request via the server controller 6 to the requisite server 7.

There are two ways of handling the request. The first is to use a portion of the bandwidth along route 12 for the sessions, and this is accounted for between the subscriber edge device 3 and the server controller 6. In this way the request is simply intercepted and a tally of used bandwidth for that route is kept after which the packets are allowed to flow. In the second option the server 7 will want to issue an RSVP message in response to the clients 5 request in order to reserve bandwidth. The RSVP message is intercepted by the server controller 6 as it flows back towards the client 5, and an operation is carried out which is explained in the paragraph below, before a signal is received by the subscriber edge device 3 which then relays an equivalent RSVP message to the client 5.

The server controller 6 and the subscriber edge device 3 pass the intercepted RSVP message through the network, but as the message passes through it will have the effect of trying to reserve additional bandwidth in the core network. The message will be seen by each router along the path of the new reservation request, and it will attempt to reserve some bandwidth that was not there before and may fail. To prevent this from happening, the server controller 6 is configured so that when it sees the message it sends out its own release message ahead of the original message between the server controller 6 and the subscriber edge device 3, to release the requisite amount of bandwidth. This allows the original RSVP message flowing behind it to really allocate that bandwidth for this new session. Using this technique, the RSVP message from the server 7 truly goes all the way back to the client 5 just as if it were a peer-to-peer negotiation. However, there is a risk that something else might slip in between the two messages and take the released bandwidth.

An alliterative technique is to intercept the RSVP message at the server controller 6 to allow the tally of used bandwidth at that point to be changed. A signal may then be sent to the subscriber edge device 3, but the signal may take the form of a proprietary message that will allow the subscriber edge device 3 to update its tally of used bandwidth, and recreate the RSVP message to send to the client 5. Using this technique, any suitable peer-to-peer messaging system may be used to conduct the internal messaging between the subscriber edge device 3 and the server controller 6, for instructing the subscriber edge to re-issue the request and adjust its tally.

The advantage of using the first technique where the bandwidth is released and a RSVP message is passed on afterwards, is that it does not require any new protocol or message to be defined because the inherent RSVP mechanisms are being utilized. Nevertheless, there is the slight risk that once the bandwidth has been released it may not be possible to get the bandwidth back.

Two load balancing algorithms, one at the network edge A and one at the data center B may be used for balancing the load of the servers 7 and for determining the server 7 having the best capacity to service free customers. The algorithms are transparent to each other. The data center algorithm handles the fair sharing of the servers' 7 capacity of bandwidth and policy for the server controller 6. The network edge algorithm handles the selection of the freest route, i.e. best network connectivity, and policy for the subscriber edge device 3. Network policies for offering out fair shares of server bandwidth are able to be automatically incorporated into the server controllers 6 and/or subscriber edge devices 3, as the transaction mechanism employed is RSVP.

In addition to the two transaction mechanisms described above where the RESV message may operate to reserve the offered bandwidth, or the RESV message may operate to release the bandwidth before reserving the required amount, another mechanism may be employed. This other mechanism involves making predictive time of day reservations for reserving a pool of bandwidth for one or a small set of bandwidth requirements.

The scheme of reserving bandwidth before releasing the un-needed amount is beneficial to the user, whereas releasing bandwidth before reserving the required amount is beneficial to the network. However, the making of predictive reservations may be of benefit to either the user or the network depending on the actual requirement of bandwidth at the time of use. Which scheme is used depends on the policies loaded into the server controller 6 and/or the subscriber edge device 3. However, policy that relates to setting up the network to serve gross content is more likely to be set up at the user end, i.e. the network edge A, but the policy that enables the server controller 6 to offer to share out all of the server capacity, which is important for the invention, is set at the data center edge B of the network.

It is also possible to drop bulk reservations and instead create microflows, in which case the implementing policy may need adjustment. This may be done by admission control in subscription reviews allowing the subscriber edge device 3 to know on average how much bandwidth it needs to reserve because of user service subscriptions.

Policy is also set at the network edge A so that when there is more than one route available to the user, the subscriber edge device 3 will use the freest route, i.e. the route with the most available bandwidth.

RSVP is a soft state protocol, i.e. it needs refreshing which can lead to a different offer being proposed each time it is refreshed. Also, RSVP messages can be pushed by routers so that they can be used by best effort traffic. If the subscriber edge devices 3 and the server controllers 6 do not use RSVP for signaling between themselves, then they will need to detect the level of bandwidth using another mechanism and to find a way of knowing how much bandwidth is required for the given service. In addition, some way of detecting the end of the session will be needed so that the bandwidth can be restored and re-assigned as needed. The advantage of using RSVP is that the above-described methods benefit from the inherent network behavior of RSVP, and so there is no need to use other mechanisms for achieving this network behavior.

It will be noted that the above-described techniques are session based, in the sense that there is no guarantee that service can be maintained at the same level over several sessions. The techniques are not necessarily trying to pick the best resource, for example for a premium service, but are seeking to share out resources optimally.

Instead of deploying policies at the network edge A and data center edge B, policies relating to the apportioning of bandwidth may be managed by a central policy manager or bandwidth broker as illustrated in FIG. 2. The bandwidth broker 9 is in communication with the server controllers 6 and the subscriber edge devices 3. Depending on the network topology, instead of there being two load balancing algorithms, only one need be employed at the bandwidth broker 9.

Also, edge based controllers may optionally be interfaced to the subscriber edge devices 3, that can map server capacity onto a network capacity to provide an accurate measure of the available capacity of the bandwidth to the subscriber edge devices 3.

Although the invention has been shown and described with respect to a best mode embodiment thereof, it should be understood by those skilled in the art that the foregoing and various other changes, omissions and additions in the form and detail thereof may be made therein without departing from the scope of the invention as claimed.

We claim:

1. A method of distributing server load in an IP network, comprising:
   building an association between a subscriber edge device and a server controller using a packet switched network Quality of Service QoS mechanism;
   offering out a fair share of server bandwidth to the subscriber edge device;
   directing a resource request from a client using the subscriber edge device to a server having an amount of the fair share of server bandwidth required by the client, through a server controller; and
   reserving the required fair share of server bandwidth, or a portion thereof, for meeting the resource request of the client.

2. A method according to claim 1 further comprising:
   releasing enough of the reserved share of bandwidth sufficient to allow the network to admit a data flow of the requested resource on the remaining share of reserved bandwidth.

3. A method according to claim 2 further comprising periodically re-calculating the available bandwidth to each edge-based device.

4. A method according to claim 1 wherein said step of reserving comprises:
   using a portion of the available bandwidth for setting up a session for admitting a data flow for the requested resource.

5. A method according to claim 1 wherein said step of reserving comprises:
   intercepting a reservation message issued by the server; and
   keeping a tally on both the server controller and the subscriber edge device of used bandwidth for a route through the IP network.

6. A method according to claim 1 wherein said step of reserving comprises:
   intercepting a reservation message issued by the server;
   issuing a release message, ahead of the reservation message travelling from the server controller to the subscriber edge device, for releasing the requested amount of the offered fair share of server bandwidth; and
   forwarding the reservation message to the subscriber edge device behind the release message.

7. A method according to claim 1 further comprising:
   determining the fair share of server bandwidth taking into account one of the following factors: capacity of the servers, capacity of the network, network connectivity of the servers, response time of the servers, distance to the servers, load on the servers, and fixed reservations for unsubscribed users.

8. A method according to claim 1 further comprising operating the server controller to determine the fair share of the server bandwidth.

9. A method according to claim 1 further comprising:
   providing a load balancing algorithm on the server controller; and operating the load-balancing algorithm to determine the fair share of server bandwidth.

10. A method according to claim 1 further comprising operating the edge-based device to select which fair share, or portion thereof, to reserve.

11. A method according to claim 1 further comprising:
providing a load balancing algorithm on the edge-based device; and
operating the load balancing algorithm to select which fair shares, or portion thereof, to reserve.

12. A method according to claim 1 further comprising:
providing a load balancing algorithm on each of the edge-based device and the server controller; and
operating the load balancing algorithms to manage the allocating, offering, and reserving of fair shares of server bandwidth for meeting the resource request of the client.

13. A method according to claim 1 wherein the QoS mechanism used is RSVP.

14. A method of distributing server lead in an IP network, comprising:
building an association between a subscriber edge device and a server controller using a packet switched network Quality of Service QoS mechanism;
offering out a fair share of server bandwidth to the subscriber edge device;
requesting an amount of the offered fair share of server bandwidth from a server through the server controller;
intercepting a reservation message issued by the server for reserving the offered fair share of server bandwidth, or a portion thereof; and
keeping a tally on both the server controller and the subscriber edge device of used bandwidth for a route through the IP network.

15. A method according to claim 14 wherein the QoS mechanism used is RSVP.

16. A method of distributing server load in an IP network, comprising:
building an association between a subscriber edge device and a server controller using a packet switched network Quality of Service QoS mechanism;
offering out a fair share of server bandwidth to the subscriber edge device;
requesting an amount of the offered fair share of server bandwidth from a server through the server controller;
intercepting a reservation message issued by the server for reserving the requested amount of server bandwidth;
issuing a release message, ahead of the reservation message travelling from the server controller to the subscriber edge device, for releasing the requested amount of the offered fair share of server bandwidth; and
forwarding the reservation message to the subscriber edge device behind the release message.

17. A method according to claim 16 wherein the QoS mechanism used is RSVP.

18. A subscriber edge device for an IP-based network, comprising:
a data input for receiving data from the network;
a data output for sending data to the network;
a resource requester for identifying a request for a resource in data received at the data input and for sending a network request to a server controller associated with the source location of the resource specified in a client request;
a resource reserver for reserving an amount of bandwidth offered by the server controller through a QoS mechanism and for releasing any unneeded amount of bandwidth, wherein the device is adapted to make use of bandwidth optimally; and
a resource returner for obtaining the requested resource from the source location of the requested resource using the reserved amount of bandwidth, and for returning the requested resource to a client.

19. A device according to claim 18, wherein the resource reserver is configured to release an amount of unneeded bandwidth sufficient to admit a data flow of the requested resource on the remaining share of reserved bandwidth.

20. A device according to claim 18 further comprising, a load balancing algorithm for selecting which fair shares, or portion thereof, to reserve.

21. A communications network comprising the subscriber edge device as claimed in claim 18.

22. A data center device for an IP-based network, comprising:
a data input for receiving data from the network;
a data output for sending data to the network;
a resource allocator for allocating fair shares of server bandwidth to the network; and
a server controller for offering the allocated fair shares of server bandwidth in response to a resource request received from the network, using a Quality of Service QoS mechanism.

23. A device according to claim 22 further comprising:
a load balancing algorithm for determining the fair share of server bandwidth.

24. A device according to claim 22, wherein the resource allocator comprises a load-balancing algorithm.

25. A device according to claim 22 further comprising:
a bandwidth calculator for periodically re-calculating the available bandwidth to the network.

26. A communications network comprising the data-center device as claimed in claim 22.

27. A communications network according to claim 26 further comprising a subscriber edge device for an IP-based network, comprising:
a data input for receiving data from the network;
a data output for sending data to the network;
a resource requester for identifying a request for a resource in data received at the data input and for sending a network request to a server controller associated with the source location of the resource specified in a client request;
a resource reserver for reserving an amount of bandwidth offered by the server controller through a QoS mechanism and for releasing any unneeded amount of bandwidth, wherein the device is adapted to make use of bandwidth optimally; and
a resource returner for obtaining the requested resource from the source location of the requested resource using the reserved amount of bandwidth, and for returning the requested resource to a client.

28. A computer readable storage medium storing instructions that, when executed by a computer, cause the computer to perform a method of distributing server load in an IP network, the method comprising:
building an association between a subscriber edge device and a server controller using a packet switched network Quality of Service QoS mechanism;
offering out a fair share of server bandwidth to the subscriber edge device;

directing a resource request from a client using the subscriber edge device to a server having an amount of the fair share of server bandwidth required by the client, through the server controller; and reserving the required fair share of server bandwidth, or a portion thereof, for meeting the resource request of the client.

29. A computer readable storage medium storing instructions that, when executed by a computer, cause the computer to perform a method of distributing server load in an IP network, the method comprising:

building an association between a subscriber edge device and a server controller using a packet switched network Quality of Service QoS mechanism;

offering out a fair share of server bandwidth to the subscriber edge device;

requesting an amount of the offered fair share of server bandwidth from a server through the server controller;

intercepting a reservation message issued by the server for reserving the offered fair share of server bandwidth, or a portion thereof; and keeping a tally on both the server controller and the subscriber edge device of used bandwidth for a route through the IP network.

30. A computer readable storage medium storing instructions that, when executed by a computer, cause the computer to perform a method of distributing server load in an IP network, the method comprising:

building an association between a subscriber edge device and a server controller using a packet switched network Quality of Service QoS mechanism;

offering out a fair share of server bandwidth to the subscriber edge device;

requesting an amount of the offered fair share of server bandwidth from a server through the server controller;

intercepting a reservation message issued by the server for reserving the requested amount of server bandwidth;

issuing a release message, ahead of the reservation message travelling from the server controller to the subscriber edge device, for releasing the requested amount of the offered fair share of server bandwidth; and forwarding the reservation message to the subscriber edge device behind the release message.

\* \* \* \* \*